United States Patent
Yu et al.

(10) Patent No.: US 10,467,662 B2
(45) Date of Patent: Nov. 5, 2019

(54) APPARATUS FOR APPRAISING ARTICLE

(71) Applicant: Mi-Na Yu, Changwon-si, Gyeongsangnam-do (KR)

(72) Inventors: Mi-Na Yu, Changwon-si (KR); Hyung-Woo Kim, Changwon-si (KR); Yong-Bae Jung, Changwon-si (KR)

(73) Assignee: Mi-Na Yu (KR)

( * ) Notice: Subject to any disclaimer, the term of this patent is extended or adjusted under 35 U.S.C. 154(b) by 9 days.

(21) Appl. No.: 15/558,949

(22) PCT Filed: Mar. 21, 2016

(86) PCT No.: PCT/KR2016/002822
§ 371 (c)(1),
(2) Date: Sep. 15, 2017

(87) PCT Pub. No.: WO2016/167484
PCT Pub. Date: Oct. 20, 2016

(65) Prior Publication Data
US 2018/0075495 A1  Mar. 15, 2018

(30) Foreign Application Priority Data
Apr. 17, 2015  (KR) .................. 10-2015-0054573

(51) Int. Cl.
*G06K 9/46*  (2006.01)
*G06T 7/00*  (2017.01)
(Continued)

(52) U.S. Cl.
CPC ....... *G06Q 30/0278* (2013.01); *G06K 9/2036* (2013.01); *G06K 9/325* (2013.01);
(Continued)

(58) Field of Classification Search
CPC ......... G06T 7/0002; G06T 7/40; G06T 7/529; G06K 9/00577; G06K 9/46; G06K 9/4652;
(Continued)

(56) References Cited

U.S. PATENT DOCUMENTS 5,521,984 A * 5/1996 Denenberg et al. ........................ G06K 9/00134
382/209
2017/0293894 A1* 10/2017 Taliwal et al. ......... G06Q 10/20

FOREIGN PATENT DOCUMENTS

KR   10-1988-0003179 A   5/1988
KR   10-2004-0050941 A   6/2004
(Continued)

OTHER PUBLICATIONS

Machine translation of KR-10-1145293-B1 (published in Korean on May 14, 2012).*
(Continued)

*Primary Examiner* — Andrew W Johns
(74) *Attorney, Agent, or Firm* — Brinks Gilson & Lione

(57) ABSTRACT

The present disclosure relates to an apparatus for appraising an article. The apparatus for appraising an article includes: a communication unit receiving a photographed image including a partial image an entire image of the article; and a processing unit analyzing the photographed image, extracting characteristic point information of the photographed image based on a result of the analyzing of the photographed image, comparing the characteristic point information with reference information for the article to determine authenticity and an appearance grade of the article, and calculating an evaluation amount of the article based on the authenticity and the appearance grade of the article.

19 Claims, 8 Drawing Sheets

(51) Int. Cl.
*G06Q 30/02* (2012.01)
*G06K 9/62* (2006.01)
*G06Q 30/06* (2012.01)
*G06K 9/20* (2006.01)
*G06K 9/32* (2006.01)

(52) U.S. Cl.
CPC ............. *G06K 9/46* (2013.01); *G06K 9/4652* (2013.01); *G06K 9/6202* (2013.01); *G06Q 30/0609* (2013.01); *G06Q 30/0623* (2013.01); *G06T 7/0002* (2013.01); *G06Q 30/0248* (2013.01); *G06T 2207/10024* (2013.01)

(58) Field of Classification Search
CPC ............. G06K 9/4671; G06Q 30/2078; G06Q 30/0623
See application file for complete search history.

(56) References Cited

FOREIGN PATENT DOCUMENTS

| | | |
|---|---|---|
| KR | 10-0524176 B1 | 10/2005 |
| KR | 10-2007-0082362 A | 8/2007 |
| KR | 10-2008-0055579 A | 6/2008 |
| KR | 10-1145293 B1 | 5/2012 |
| KR | 10-2014-0048813 A | 4/2014 |

OTHER PUBLICATIONS

Machine translation of KR-10-2008-0055579-A (published in Korean on Jun. 19, 2008).*
Machine translation of KR-10-0524176-B1 (published in Korean on Oct. 25, 2005).*
International Search Report dated Jul. 5, 2016, corresponding to PCT/KR2016/002822.

* cited by examiner

APPARATUS FOR APPRAISING ARTICLE

CROSS-REFERENCE TO RELATED APPLICATIONS

This application is a filing under 35 U.S.C. § 371 of International Patent Application PCT/KR2016/002822, filed Mar. 21, 2016, and claims the priority to KR 10-2015-0054573, filed Apr. 17, 2015. These applications are incorporated by reference herein in their entirety.

FIELD

The present disclosure relates to an apparatus for appraising an item.

BACKGROUND

The statements in this section merely provide background information related to the present disclosure and may not constitute prior art.

As a demand for expensive articles such as bags, watches, jewelry, clothes, miscellaneous goods, pictures, works of art, etc. increases, similar products and imitations are provided in substantial quantities. Some consumers knowingly make purchases of the similar products and imitations, but the frequency of fraudulent transactions is gradually increasing since consumers often cannot easily determine authenticity of such articles. Consequently, an illegal distribution market is gradually expanding due to the increase in the transactions of similar products and imitations of the articles.

Conventionally, there are a method of appraising authenticity of an actual article by a professional appraiser and a method of appraising authenticity of an article by using a camera and a device with a camera (for example, a portable terminal, a table pc, a laptop, a smart phone, etc.) to photograph an entire image and a partial image of the article and by transmitting the images of the article to a professional appraiser for analysis of the images.

Related thereto, the invention entitled "trade/payment agent system and method for used article" is disclosed in Korean Patent Application Publication No. 2014-0048813. The method disclosed in Korean Patent Application Publication No. 2014-0048813 is problematic in that there are restrictions on time and place in appraising and professional appraisers must always exist.

SUMMARY

The present disclosure is to provide an apparatus for appraising an article, the apparatus being capable of precisely identifying authenticity of the article by photographing an image and taking a video of the article by using hardware and peripherals such as a camera, a device having a camera, a 3D scanner, etc. regardless of existence of professional appraisers.

Another aspect of the present disclosure is to provide an apparatus for appraising an article, the apparatus being capable of deriving authenticity of an article as well as an evaluation amount of the article from various big data.

In order to accomplish the above object, the present disclosure provides an apparatus for appraising an article, the apparatus including: a communication unit receiving a photographed image including a partial image or an entire image of the article; and a processing unit analyzing the photographed image, extracting characteristic point information of the photographed image based on a result of the analyzing of the photographed image, comparing the characteristic point information with reference information for the article to determine authenticity and an appearance grade of the article, and calculating an evaluation amount of the article based on the authenticity and the appearance grade of the article.

Also, the processing unit may distinguish a brand and a type of the article based on the photographed image.

Also, the processing unit may analyze the photographed image by selecting at least one of several image analysis methods based on the distinguished brand and the distinguished type of the article.

Also, the processing unit may extract color information of the article, and may extract a tanned degree or a discolored degree of the article based on the color information.

Also, the processing unit may calculate the evaluation amount of the article based on the tanned degree or the discolored degree.

Also, the characteristic point information may include characteristic point information on a serial number of the article, and the processing unit may extract a manufacturing year of the article based on the serial number.

Also, the processing unit may extract a product model name of the article.

Also, the processing unit may calculate the evaluation amount of the article based on the product model name.

Also, the processing unit may search an external server or a storage unit for product information of the article based on the product model name, and the product information of the article may include at least one of an article amount including a factory price and a used price, a manufacturer, a seller, a store, a release year, a manufacturing year, a color, a trademark, a model, a grade, a weight, a material, a form, a maker, and inventory information for each store.

Also, the processing unit may calculate the evaluation amount of the article based on the product information of the article.

Also, the communication unit may receive information on a customer location, and the processing unit may transmit information on a closest store to the customer location to a terminal of a customer based on the store and the inventory information for each store that are included in the product information.

Also, the communication unit may receive the photographed image for at least one of a bibliography, a warranty, a written appraisal, a guarantee card, and a warranty card of the article, and the processing unit may extract the characteristic point information for at least one of a serial number, a reference number, a code number, a bar code, an image, a shape, and a letter included in the photographed image for at least one of the bibliography, the warranty, the written appraisal, the guarantee card, and the warranty card of the article.

Also, the communication unit may receive information on a type and a model name of the article that is input by a customer.

Also, the processing unit may distinguish a brand and the type of the article based on the information on the type and the model name of the article that is input by the customer.

Also, the apparatus for appraising an article according to an embodiment of the present disclosure may further include a terminal holding unit holding a terminal having a camera photographing the article.

Also, the terminal holding unit may include at least one supporting part, a mounting part for holding the terminal thereon, and a lens body mounted on the terminal.

Also, the lens body may include at least one magnifying lens therein.

Also, a side of the lens body may be provided with a lamp unit, the lamp unit may include several UV (ultraviolet) lamps and several LED lamps, and the several UV lamps and the several LED lamps may be provided in a shape surrounding the magnifying lens.

Also, each LED lamp and each UV lamp may be alternately provided, namely, each of the several LED lamps may be provided between two of the several UV lamps.

Also, the lens body may include a rotary magnification adjusting housing adjusting a magnification of the magnifying lens by being rotated.

According to an apparatus for appraising an article of the present disclosure, appraisal of the article is performed according to a preset appraisal algorithm regardless of existence of professional appraisers, and thus appraisal can be performed without restrictions on time and place.

Also, the apparatus for appraising an article of the present disclosure can provide product information for an appraisal target article to customers, for example, detailed information on a market price, a release year, a manufacturing year, a color, a trademark, a model, a grade, a weight, a material, form analyses, etc. through connection with data stored in the storage unit or the external server. Furthermore, various kinds of information such as a store and inventory, etc. of the article can be provided.

Also, the apparatus for appraising an article of the present disclosure can be applied to various systems, for example, a connection system connecting the seller and the customer by providing the product information, a system providing information on a closest store to a current location of the customer based on location information of the customer, a search analysis system calculating and providing movable assets valuation information and valuation necessary for financial institutions and loan companies, etc. that provide a loan with movable assets for collateral to set an appraisal value by estimating the current value of collateral, as well as a price comparison service, a commercial information provision service, a product sample service, a marketing service, market research, advertisement, an online auction service, etc.

DRAWINGS

In order that the disclosure may be well understood, there will now be described various forms thereof, given by way of example, reference being made to the accompanying drawings, in which.

Figure 1:
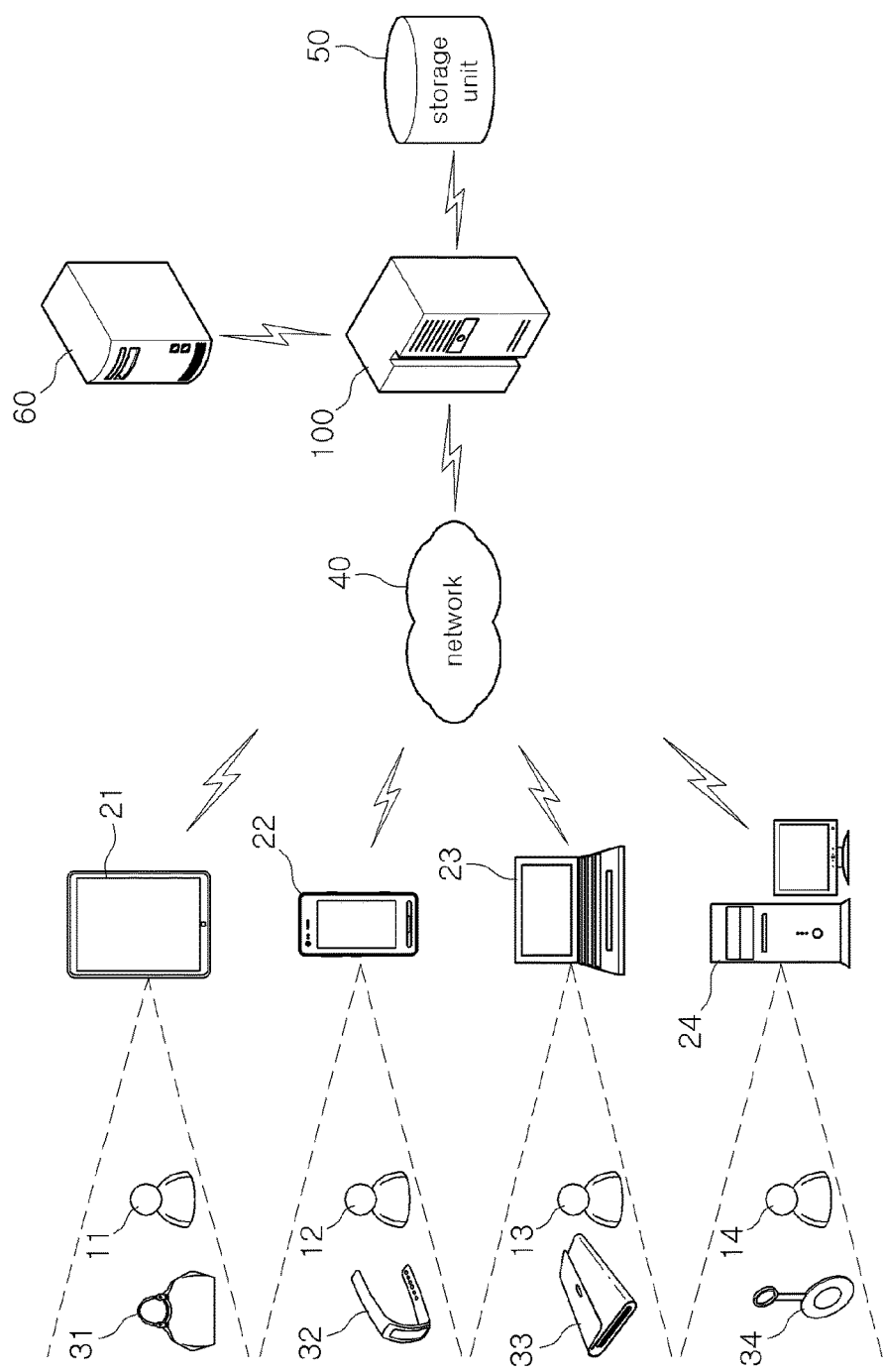
FIG. 1 is a schematic view illustrating an apparatus for appraising an article according to an embodiment of the present disclosure.

The drawings described herein are for illustration purposes only and are not intended to limit the scope of the present disclosure in any way.

DETAILED DESCRIPTION

The present disclosure will be described in detail below with reference to the accompanying drawings. Here, repeated descriptions and descriptions of known functions and configurations which have been deemed to obfuscate the gist of the present disclosure will be omitted. The embodiments of the present disclosure are intended to fully describe the present disclosure to a person having ordinary knowledge in the art to which the preset disclosure pertains. Accordingly, the shapes, sizes, etc. of components in the drawings may be exaggerated in order to make the description clearer.

Hereinafter, an apparatus 100 for appraising an article according to an embodiment of the present disclosure will be described.

Figure 2:
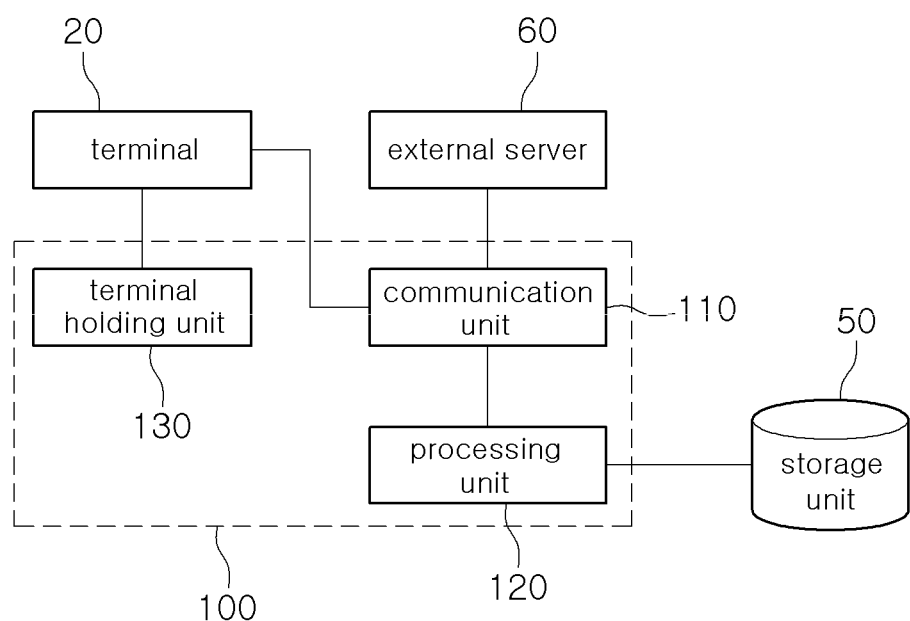
FIG. 2 is a block diagram illustrating an apparatus for appraising an article according to an embodiment of the present disclosure.

FIG. 1 is a schematic view illustrating an apparatus 100 for appraising an article according to an embodiment of the present disclosure. FIG. 2 is a block diagram illustrating an apparatus 100 for appraising an article according to an embodiment of the present disclosure.

The present disclosure relates to an apparatus 100 for appraising an article. When a customer obtains an image of the article by photographing the article through a portable or own terminal of the customer, the apparatus can determine authenticity and calculate an evaluation amount of the article based on the image. Specifically, the apparatus 100 for appraising an article according to the embodiment of the present disclosure can distinguish a type and a brand of the article based on a photographed image received from customers 11 to 14. Also, the apparatus 100 for appraising an article according to the embodiment of the present disclosure can use type and brand information of the article that is input through a keypad, touchpad of the terminal or voice and is transmitted from the customers 11 to 14. Next, the apparatus 100 for appraising an article of the present disclosure can determine authenticity of the article and can calculate an evaluation amount of the article based on reference information stored in a storage unit 50 or an external server 60. To this end, the apparatus for appraising an article according to the embodiment of the present disclosure may include a communication unit 110, a processing unit 120, and a terminal holding unit 130 as shown in FIG. 2. Hereinafter, the apparatus 100 for appraising an article according to the embodiment of the present disclosure will be described with reference to FIG. 2.

The terminal, which is a term referred to throughout the description, may be defined as a device having a camera or being connected to a camera to collect photographed images and transmit the photographed images to the apparatus 100 for appraising an article of the present disclosure, for example, a tablet PC 21, a smart phone or cellular phone 22, a laptop PC 23, and a computer 24. That is, the terminal is not limited to a particular device. Also, as shown in FIG. 1, the article may be various articles such as bags, watches, wallets, miscellaneous goods, jewelry, etc. without being limited to a particular item. Also, various devices such as 3D scanner, etc. can be used as a collecting device for the photographed image.

Referring to FIG. 2, the communication unit 110 is used to communicate with the terminal 20. As described above, the present disclosure determines authenticity and calculates an evaluation amount of the article based on the photographed image transmitted from the terminal 20. Also, the present disclosure transmits information on the determined authenticity and the calculated evaluation amount to the terminal 20. Also, the communication unit 110 may communicate with the terminal 20 as well as with the external server 60.

The photographed image described above indicates an image taken by a customer for appraisal of the article. However, an important point for appraisal of the article may differ depending on a type, brand, and product model name of the article. For example, the photographed image may include a full HD resolution image or video. The apparatus 100 for appraising an article of the present disclosure may specify a particular shape, portion, or a random portion as an appraisal point of a subject, i.e., the article, and may induce the customer to transmit a photographed image for the portion.

The processing unit 120 performs member authentication of the customers 11 to 14. Here, member authentication may be performed in various manners, and thus additional description thereof will be omitted.

Also, the processing unit 120 determines authenticity of the article and calculates the evaluation amount of the article based on the photographed image including a partial image and an entire image of the article received through the communication unit 110. Process of determining of authenticity and calculating of the evaluation amount of the article through the processing unit 120 will be described as follows.

First, the processing unit 120 performs an image correction process for the photographed image of the article. As described above, the present disclosure performs appraisal without restrictions on time and place based on the photographed image obtained by the customer. Therefore, the qualities of the images for the article may be different or bad due to the fact that the cameras of the customers are all different models, the photographer may lack photographing skill, and various other variables exist. Accordingly, the present disclosure may improve these matters by performing correction on the photographed image. Image correction that can be performed through the processing unit 120 may include image enhancement and conversion, etc. For example, the image correction that can be performed through the processing unit 120 may be performed by using various pieces of information such as space correction information, color correction information, medium and light source information, correction information on system noise, etc.

For example, in the space correction, reprocessing operation may be performed with information suitable for image processing through spatial geometric correction between the camera and the target, which can be indicated as formula 1 below.

Formula 1

$$s \begin{bmatrix} x \\ y \\ 1 \end{bmatrix} = \begin{bmatrix} f_x & skew\_cf_x & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}$$
$$= A[R|t] \begin{bmatrix} X \\ Y \\ Z \\ 1 \end{bmatrix}$$ [Formula 1]

In formula 1, the left side indicates coordinate values, and the right side indicates matrix multiplication of internal parameters, external parameters of the camera, and a world coordinate system. Specifically, focal lengths of the camera are designated as fx and fy, and principal points are designated as cx and cy. Here, the principal point indicates a position where the light passed through a lens converges on one point of a sensor, and usually may be the center of the image. Also, in formula 1, an asymmetric coefficient is designated as skew_c. Also, in formula 1, a rotation angle of a camera is designated as R (r11 to r33), and a horizontal shift value is designated as t (t1 to t3).

Also, based on characteristics where the color of the article has similar distribution, the processing unit 120 may correct the image by using a Bayesian or Gaussian color correction method.

Also, the processing unit 120 may correct characteristics according to a system such as a CCD, a CMOS, etc., and may correct system characteristics according to a lens, a light source, optical wavelength, and surrounding environment based on the medium and light source information, and the correction information on system noise.

Also, the processing unit 120 may extract color information of the article. That is, the processing unit 120 may extract a tanned degree or a discolored degree of the article through a technique of Bayesian, Gauss, Gaussian, GMM, etc. Here, the reason for extracting color information of the article by the processing unit 120 is that even though articles, for example, bags are the same model, the bag may be discolored to a customer preferred color due to tanning, etc., or may be discolored to a customer disliked color due to long term use. The present disclosure may precisely calculate the evaluation amount by adjusting the evaluation amount according to preference of customers when calculating the evaluation amount described below.

Next, the processing unit 120 performs analysis of the photographed image for the article. Here, as the analysis method of the photographed image, for example, a morphological analysis method, a geometrical analysis method, a statistical analysis method, a probabilistic analysis method, etc. may be applied. Here, a morphological analysis method is an analysis method of configuration of a shape or a form, for example, a special letter or a pointer, etc. A geometrical analysis method is an analysis method of a geometrical structure and arrangement of a shape, etc. A statistical analysis method is an analysis method of statistical error of the number of shapes and collection information, and learning information according to subject analysis. A probabilistic analysis method is an analysis method of matching of original patterns, similarity of multiple shapes, and similarity of learning information.

Here, the photographed image may include an entire image and a partial image of the article. Through analysis of the photographed image, the processing unit 120 may distinguish a type and a product brand of the article. As described above, the present disclosure performs appraisal not of one particular article but of various articles such as watches, bags, wallets, miscellaneous goods, jewelry, etc. However, a criterion for determining authenticity may vary depending on a type of the article, and thus the processing unit 120 may distinguish a type of the article. Also, the processing unit 120 may distinguish a product brand of the article for the same reason as above.

Also, the type and product brand of the article is determined in order to selectively perform the analysis process of the photographed image based on the type and product brand of the article. That is, rather than performing all image analysis methods on all articles, only a preset analysis method is performed according to the type and brand of the article, and thus appraisal is effectively performed.

For example, when the article is a watch, in order to verify the watch, it may be necessary to perform similarity analysis such as the color of the watch hands, processed degree, the shape of the letter and mark, the depth of a pattern, etc. Also, in a case of another article, the point used in verifying the article may be different. Accordingly, the present disclosure analyzes the type and model of the article through the processing unit 120, and then receives information on the type and model to perform appraisal.

Also, when the photographed image for a bibliography, a warranty, a written appraisal, a guarantee card, or a warranty card of the article is received, the processing unit 120 may read information such as a serial number, a reference number, a code number, a bar code, an image, a shape, a letter, etc. from the bibliography, the warranty, the written appraisal, the guarantee card, or the warranty card.

Next, the processing unit 120 extracts characteristic point information of the photographed image. The characteristic point information may include characteristic point information on logo, a serial number, a flaw or contamination degree, a flaw or contamination position, etc. of the article. Also, the characteristic point information may include a damaged or changed degree of the article and a position thereof. Here, the reason for extracting the serial number of the article is that the serial number can be used in determining authenticity through comparison with the reference information stored in the storage unit 50, and the serial number can be used in identifying information on a production area and a manufacturing year or a year of production, etc. of the article. The identified manufacturing year of the article is applied in calculating the evaluation amount of the article described below.

Next, the processing unit 120 determines authenticity and an appearance grade of the article. The determining of authenticity of the article may be performed by comparing characteristic point information on the derived logo, serial number, and warranty with reference information. Also, the determining of the appearance grade of the article may be performed based on the above-described discolored degree, flaw or contamination degree and contamination position of the article. Also, the determining of the appearance grade of the article may be performed based on the damaged or changed degree of the article and the position thereof. That is, when the article is an unused article, the article may be set to an unused article grade. When the article is in a very clean condition without any mark of use, the article may be set to an S grade article. When the article is used but has few flaws, stain, discoloration, etc., the article may be set to an A+ grade article. When the article has some flaws, stain, discoloration, etc. but is in a good condition overall, the article may be set to an A grade article. When the article has partial flaws, stain, discoloration, etc. but has no abnormality at all, the article may be set to an A− grade article. When the article has flaws, stain, discoloration, contamination, etc. on the outer surface or inside thereof but does not interfere with use, the article may be set to a B grade article. When the article has flaws, stain, discoloration, contamination, etc. in several portions or has a somewhat damaged appearance, the article may be set to a C grade article. Here, the number and names of the grades may be variously changed, and setting percent or number for the grades may be variously set.

Next, the processing unit 120 calculates the evaluation amount of the article. As described above, the evaluation amount of the article may be calculated based on the determined authenticity and appearance grade of the article. Also, the present disclosure may adjust the evaluation amount based on color information of the article. As described above in an example of the bag, when the bag is tanned to the customer preferred color, the value of the bag is relatively high. When the bag is tanned or discolored to a customer disliked color, the value of the bag is low in spite of product appearance being in a good condition. Therefore, the present disclosure calculates the evaluation amount by considering the color information of the article.

Also, the method of calculating the evaluation amount of the article performed through the processing unit 120 of the present disclosure may be based on a store price and a market price including a trade price and a used price of the article stored in the storage unit 50, and on the manufacturing year of the article extracted based on the serial number of the article. Also, the evaluation amount of the article may be calculated by considering at least one of whether or not a new product is released, the type, the release year, the manufacturing year, the trademark, the model, purpose of use, the material, the form, the grade, etc. of the article. Here, the method of calculating the evaluation amount is not limited to a particular method, and may be variously changed. Thus, in the description, a calculation formula or detailed calculation method for the evaluation amount is not limited to a particular method.

The calculated evaluation amount is stored in the storage unit 50 so as to be utilized as reference data for the model in future.

As described above, the apparatus 100 for appraising an article according to the embodiment of the present disclosure can determine authenticity of an appraisal target article without restrictions on time and place, and can calculate the evaluation amount in an objective manner. That is, in calculating the evaluation amount, the present disclosure may calculate the evaluation amount by considering appearance condition of the article, a price when appraising the article, and a customer preferred color, whereby the evaluation amount can be precisely calculated. Also, in order to determine a precise price, appraisal may be performed after identifying a price through connection with various servers such as the storage unit 50 storing data and the external server 60, for example, a used price server, a trade price server, a store price server, etc.

Also, in another embodiment, the apparatus 100 for appraising an article of the present disclosure may perform a function of a research system on article information requested by the customer. That is, when the customer transmits the photographed image of the article, the apparatus 100 for appraising an article may identify a model name of the article through the above-described method, and may provide detailed information of the article to the customer through connection with the storage unit 50 and the external server 60. Here, the information that may be provided to the customer may include various pieces of detailed information such as the type, the release year, the manufacturing year, the price, the color, the trademark, the model, the grade, the weight, the material, form analyses, etc. of the article.

Furthermore, according to the photographed image and a view of a video of the article, information on flaws of accessories, type of accessories, portions requiring repair, etc. may be provided. Also, information on handling precautions, use manual, etc. for the article may be provided. In this case, this search function may be provided by being realized online through web pages, a mobile web, SNS, applications, etc.

Also, the apparatus 100 for appraising an article of the present disclosure can be applied not only to the above-described effects and the search system, but also to various fields. For example, when location information of the customer and product information are transmitted by using the terminal 20 of the customer to the apparatus 100 for appraising an article through GPS, WiFi, and communication devices, etc., the apparatus 100 for appraising an article may be applied in various manners. For example, the apparatus may provide search result of information on a store and a seller that are closest to the current location of the customer through connection with the storage unit 50 and the external server 60. Also, marketing and electronic commerce between business and business (B2B), business and consumer (B2C), and individuals may be provided by utilizing a search function and big data stored in the storage unit and the external server of the apparatus 100 for appraising an article of the present disclosure.

Accordingly, a healthy commercial market and distribution market can be vitalized by providing appraisal and information search result service for various product groups such as bags, watches, jewelry, clothes, miscellaneous goods, works of art, vehicles, IT products, etc.

Also, the apparatus 100 for appraising an article of the present disclosure may be applied as a search analysis system. The search analysis system may provide commerce information and information on the manufacturer, seller, store, etc. Also, the search analysis system may provide various pieces of information such as most preferred item and type obtained by analyzing the frequency of users for an image and image processing of the article, and may provide various pieces of marketing information such as a price (a factory price, a used price), a market price (the highest price, the lowest price, the average price), inventory quantity, distribution, manufacturers, sellers, stores, etc. for an item (product). The search analysis system may calculate and provide movable assets valuation information and valuation necessary for financial institutions and loan companies, etc. that provide a loan with movable assets for collateral to set appraisal value by estimating current value of collateral.

Also, the apparatus 100 for appraising an article of the present disclosure may be applied as a system that has a function of extracting main elements for authenticity and differential evaluation of the article and providing (displaying) sample image in the order of actual photographing and a function of providing (displaying) detailed use guidance text. Based on the sample images, a photographing manual composed of detailed sample images and various instructions that are necessary in obtaining an image and a video of the article may be realized as Augmented Reality (AR) through wired/wireless devices of the customer.

Figure 3:
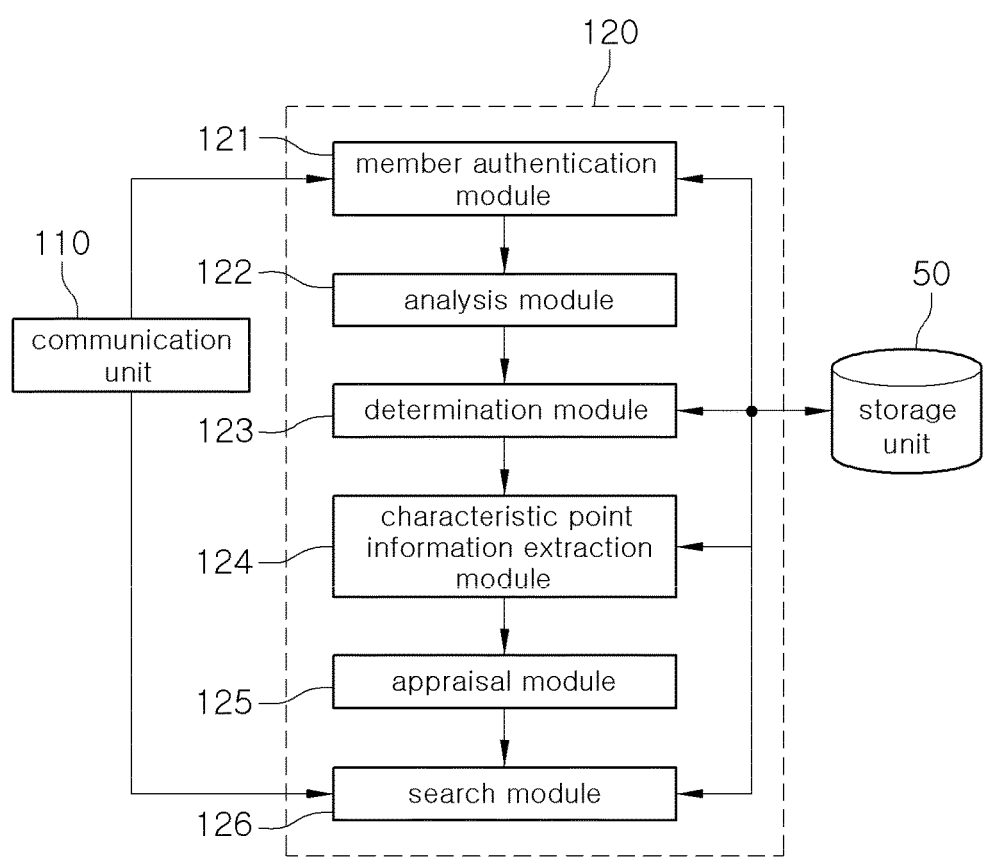
FIG. 3 is a block diagram illustrating a processing unit according to an embodiment of the present disclosure.

FIG. 3 is a block diagram illustrating a processing unit 120 according to an embodiment of the present disclosure. The processing unit 120 according to the embodiment of the present disclosure may include: a member authentication module 121, an analysis module 122, a determination module 123, a characteristic point information extraction module 124, an appraisal module 125, and a search module 126. Hereinafter, the components included in the processing unit 120 according to the embodiment of the present disclosure will be described. Also, a repeated description will be omitted.

The member authentication module 121 performs member authentication of the customer. Also, the member authentication module 121 may perform member registration on a customer who is a nonmember by using personal information of the customer. Here, member registration may be performed after performing real name authentication based on personal information of the customer, The analysis module 122 analyzes the photographed image of the article received through the communication unit 110. As described above with reference to FIG. 2, as an analysis method of the photographed image, a morphological analysis method, a geometrical analysis method, a statistical analysis method, a probabilistic analysis method, etc. may be applied. Descriptions of analysis methods have been described in detail with reference to FIG. 2, and thus additional descriptions thereof will be omitted. Also, before analyzing the article, the analysis module 122 may correct the photographed image, and may extract the color information. Descriptions thereof have been described above in detail, and thus additional descriptions thereof will be omitted.

The determination module 123 determines a type and a product model name of the article based on a result of the analysis through the analysis module 122. Here, determining of the type and the product model name of the article may be performed through comparison with reference information stored in the storage unit 50. Also, in another embodiment, the determination module 123 may determine the type and product model name of the article by using information on the type and model name of the article that are directly input by the customer through a keypad, a touch pad, voice, etc. As described above, the reason for determining of the type and product model name of the article is that the present disclosure can be applied to various kinds of items other than only one particular item, and different appraisal criteria can be applied according to the type and product brand of the article. Accordingly, in the analysis methods of the photographed image through the analysis module 122, different appraisal criteria can be applied according to the type and model name of the particle, and thus only some of the above-described analysis methods may be performed. Also, the optimum algorithm may be selected from various algorithms for the analysis methods, for example, algorithms for selection, analysis order, etc. of the analysis methods.

The characteristic point information extraction module 124 extracts characteristic point information of the photographed image. Here, characteristic point information may include information on logo, the serial number, the flaw or contamination degree, the flaw or contamination position, etc. of the article.

The appraisal module 125 determines authenticity and an appearance grade of the article. As described above, authenticity of the article may be determined by comparing characteristic point information on logo, the serial number, and the warranty with reference information stored in the storage unit 50. Also, the appearance grade of the article may be determined based on the color information, the damaged or changed degree, the flaw or contamination degree, the flaw or contamination position, etc. of the article. Here, the appearance grade of the article may be classified into preset numbers according to a predefined criterion, and descriptions thereof have been described above in detail, thus additional descriptions thereof will be omitted.

Also, the appraisal module 125 may calculate the evaluation amount of the article. Here, the evaluation amount may be calculated based on product information stored in the storage unit 50 or collected through connection with the external server 60, and based on the determined appearance grade and authenticity of the article. Also, the evaluation amount may be calculated by considering the manufacturing year extracted based on the serial number of the article. Also, the evaluation amount may be variably adjusted depending on the color of the article. Information on authenticity and the evaluation amount of the appraised article may be transmitted to the customer, and the information may be stored in the storage unit 50 to be utilized as reference data for the model in future.

Upon customer's request, the search module 126 may provide detailed product information of the article to a customer through connection with the storage unit 50 and the external server 60. Here, the product information that may be provided to the customer may include various pieces of detailed information such as a type, a release year, a manufacturing year, a price, a color, a trademark, a model, a grade, a weight, a material, a form, processed/ground condition, a maker, etc. of the article. Also, the product information may further include authenticity, detailed information of the article, value estimation and display of the article, information of a related article, information of a similar article, etc. That is, the product information may include various pieces of information without being limited thereto.

Figure 4:
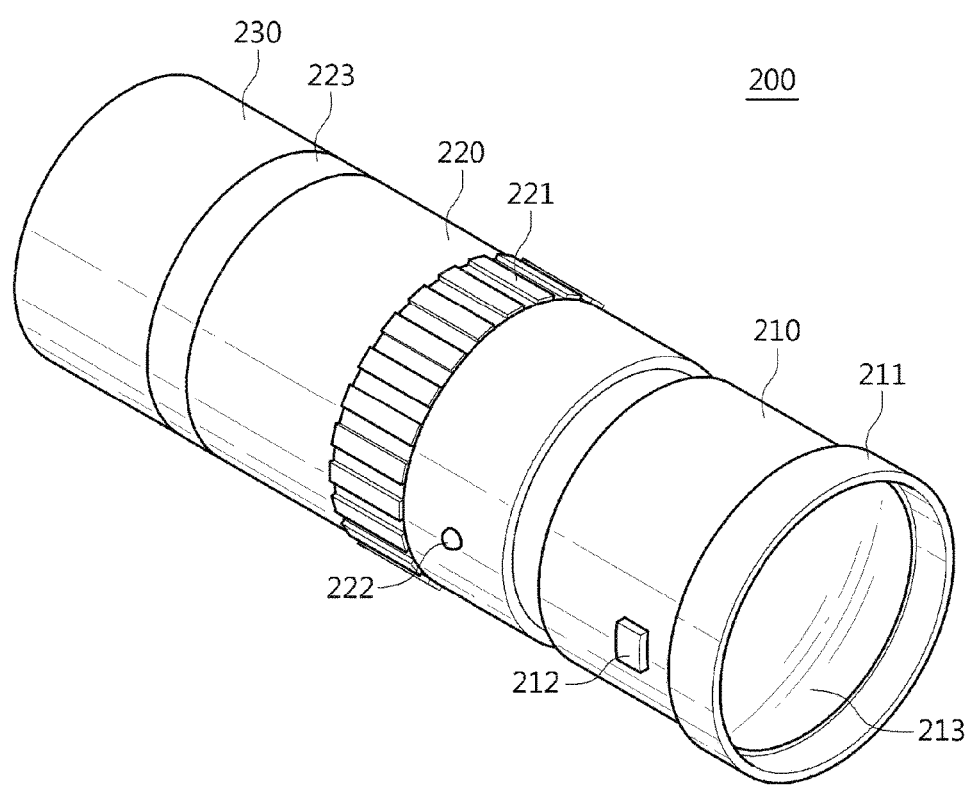
FIG. 4 is a perspective view illustrating a lens body coupled to a terminal holding unit according to an embodiment of the present disclosure.

FIG. 4 is a perspective view illustrating a lens body 200 coupled to a terminal holding unit 130 according to an embodiment of the present disclosure. As described above with reference to FIGS. 1 to 3, the present disclosure appraises the particle based on a photographed image obtained by photographing the article through a portable or own terminal of the customer. To this end, the apparatus 100 for appraising an article according to the present disclosure may include the terminal holding unit 130 to enhance the quality of the photographed image.

Here, the terminal holding unit 130 may include at least one supporting part (not shown) to prevent shaking when photographing the article. Also, the terminal holding unit 130 may include a mounting part for holding the terminal 20 thereon, and the shape of the mounting part is not limited to a particular shape.

Also, the terminal holding unit 130 may include a lens body 200 shown in FIG. 4 to enhance the photographing quality for the article. Here, the lens body 200 may include a head part 210, a body part 220, and a length adjusting part 230. Also, the lens body 200 may be mounted by pushing the lens body 200 toward the terminal after locating the head part 210 very close to the boundary portion of the terminal where the camera is positioned. Here, the lens body 200 can be fixed to the terminal without any adhesive since a vacuum state can be formed and maintained between the head part 210 and the terminal. Also, in another embodiment, the lens body 200 may be fixed to the terminal by using a head clip (not shown), etc. Hereinafter, components included in the lens body 200 of the present disclosure will be described.

The head part 210 may include a contact portion 211 being in contact with the terminal, an air release button 212, and a first lens 213. Here, it is desired that the contact portion 211 is made of rubber, etc. to increase adhesion to the terminal, and to prevent the terminal from being scratched. Also, the user presses the air release button 212 to release the air in the vacuum state between the terminal and the lens body 200 to outside. Accordingly, the compressed air between the terminal and the lens body 200 is released to outside, and the lens body 200 can be separated from the terminal.

The body part 220 may include a rotary magnification adjusting housing 221, a lamp button 222, and a second lens 224. Here, the rotary magnification adjusting housing 221 adjusts magnification of a lens included in the lens body 200 through rotation operation by the user. Specifically, the rotary magnification adjusting housing 221 is a device for adjusting magnification when obtaining an image, and may adjust magnification such as 10 magnification, 15 magnification, 20 magnification, 30 magnification, etc. Also, the lamp button 222 may adjust the brightness level of the lamp unit included in the lens body 200, and may select the lighting lamp. Description thereof will be described with reference to FIG. 5.

Also, the first lens 213 and the second lens 224 may be magnifying lenses. Here, the first lens 213 and the second lens 224 may be, for example, lenses for magnification such as a loupe lens without being limited to particular lenses. Accordingly, the lens body 200 of the present disclosure may perform magnification as well as close-up functions.

The length adjusting part 230 may adjust the length, and may be made of transparent acrylic.

Figure 5:
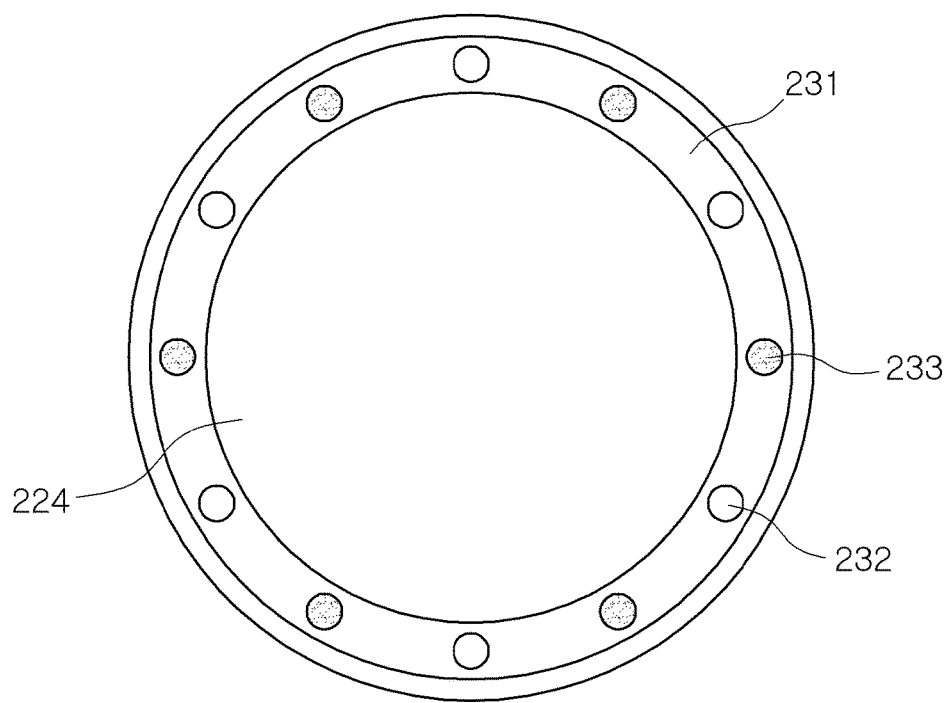
FIG. 5 is a view illustrating a lamp unit included in a lens body according to an embodiment of the present disclosure.

FIG. 5 is a view illustrating a lamp unit 231 included in a lens body 200 according to an embodiment of the present disclosure. The lamp unit 231 illuminates a subject, i.e., the article. To this end, the lamp unit 231 may include several LED lamps 232 and several UV lamps 233. Also, the several LED lamps 232 and the several UV lamps 233 may be provided in a shape surrounding the lens as shown in FIG. 5. Also, the several LED lamps 232 and the several UV lamps 233 may be alternately provided, namely, each LED lamp may be provided between two UV lamps.

Also, the several LED lamps 232 and the several UV lamps 233 may be operated when the lamp button, which is described with reference to FIG. 4, is pressed. For example, when pressing the lamp button once, LED illumination may be adjusted to a first level. The LED illumination may be adjusted to several levels based on the number of times the button has been pressed. Also, when the lamp button is pressed for a long time, the UV lamp may be switched. The description of operating the lamp button is merely an example, and may be applied in various manners.

Figure 6A:
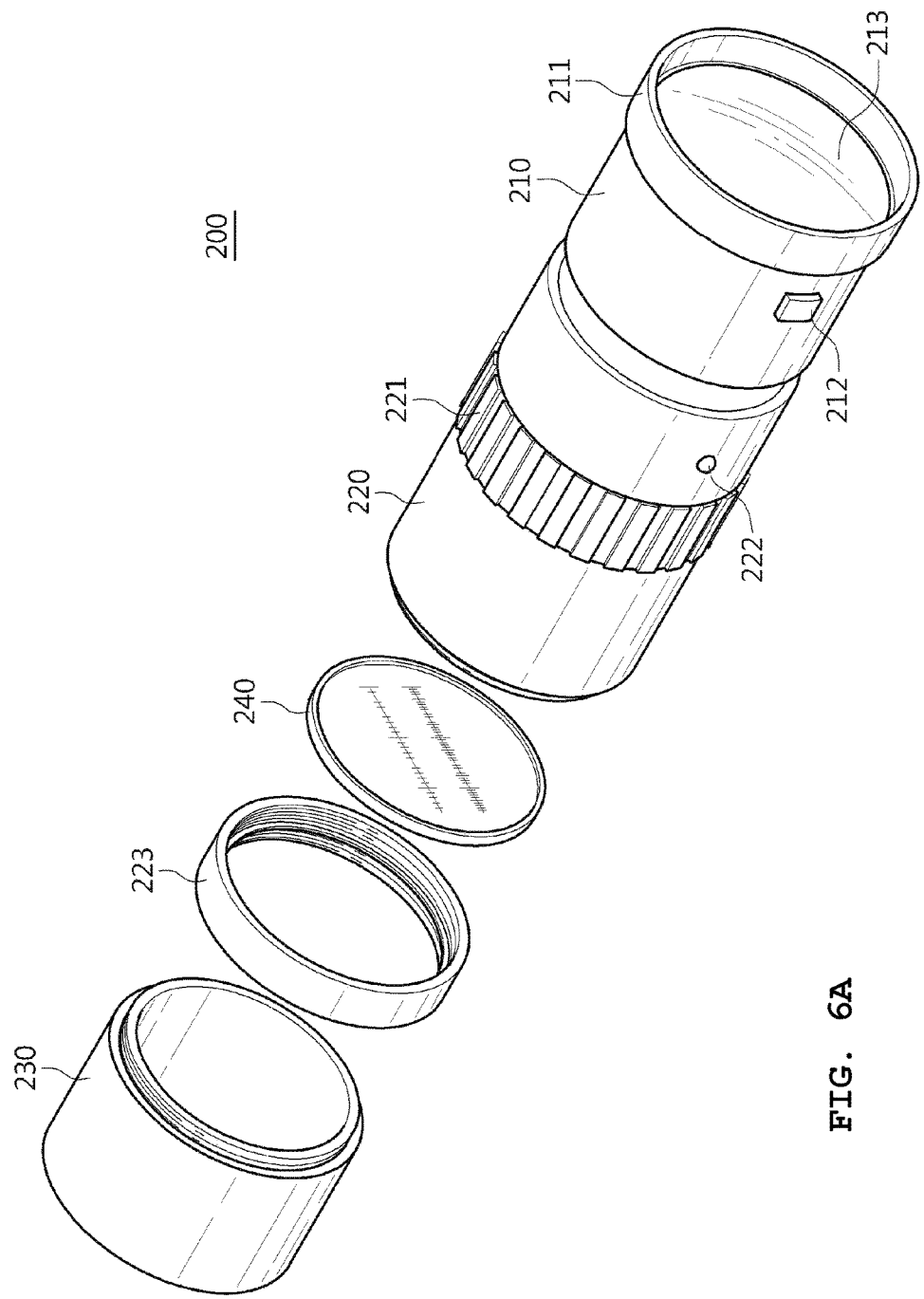
FIG. 6A is an exploded perspective view illustrating a lens body according to an embodiment of the present disclosure.
Figure 6B:
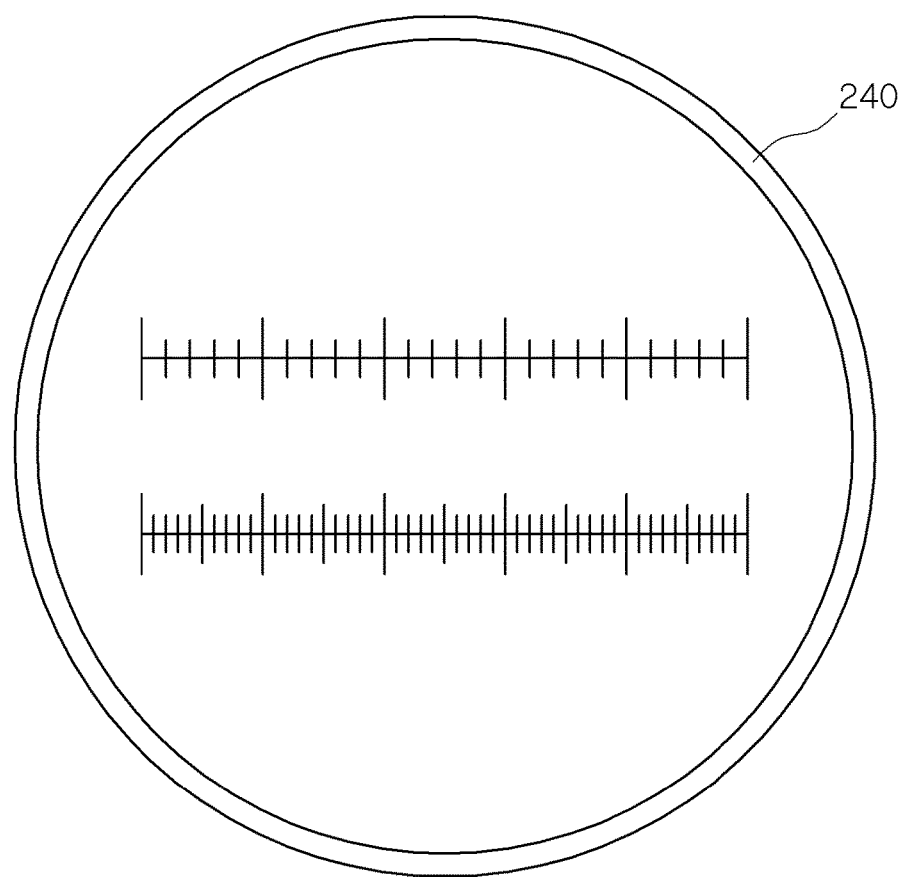
FIG. 6B is a plan view illustrating a lens filter according to an embodiment of the present disclosure.

FIG. 6A is an exploded perspective view illustrating a lens body according to an embodiment of the present disclosure. As shown in FIG. 6A, a lens body 200 according the embodiment of the present disclosure may include a lens filter 240. An example of the lens filter is shown in FIG. 6B.

Figure 7:
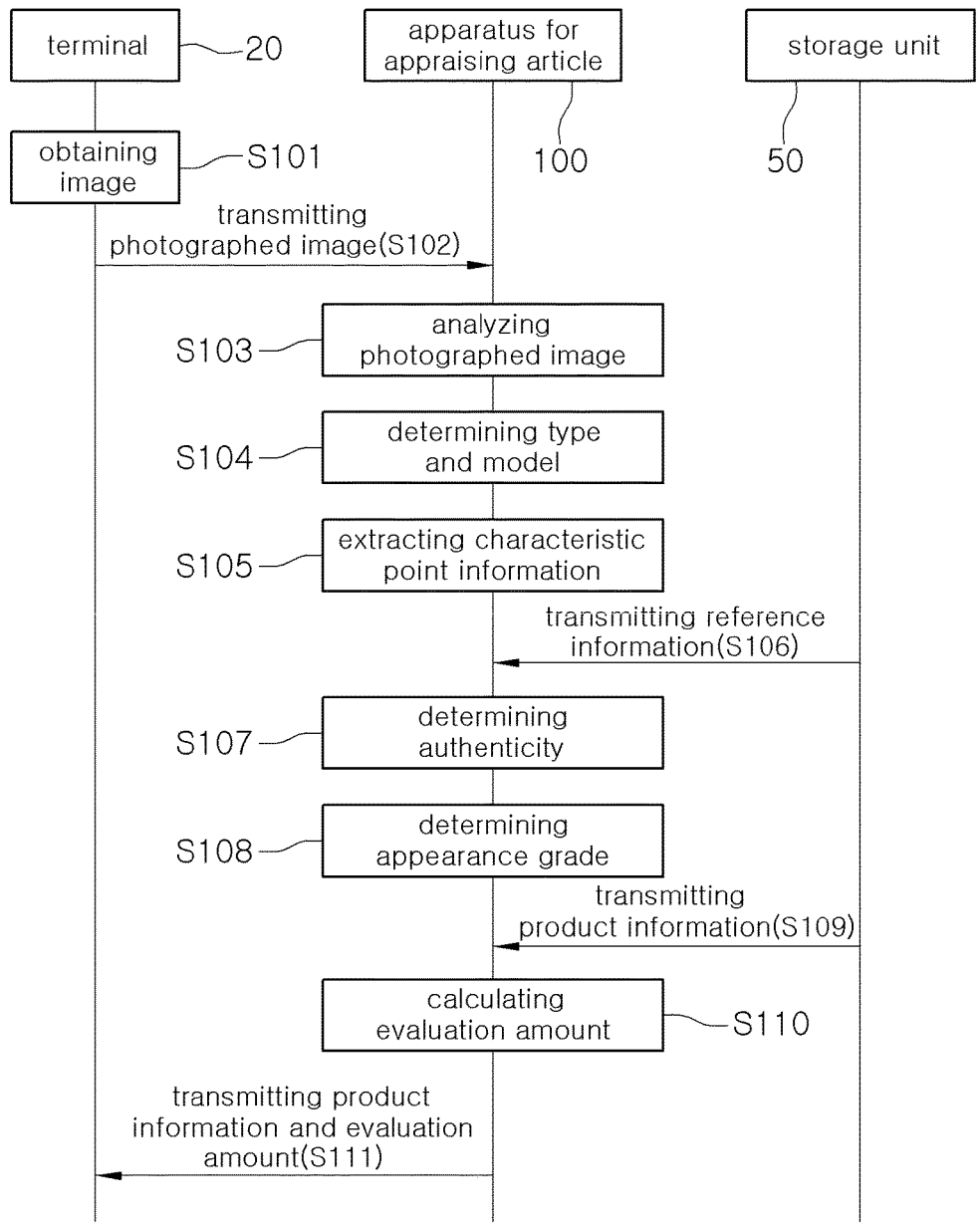
FIG. 7 is a flowchart illustrating a method of appraising an article according to an embodiment of the present disclosure.

FIG. 7 is a flowchart illustrating a method of appraising an article according to an embodiment of the present disclosure. Hereinafter, the method of appraising an article according to the embodiment of the present disclosure will be described in detail with reference to FIG. 7. A repeated description will be omitted.

First, an image of the article is obtained by using the terminal 20 at step S101, and the photographed image is transmitted to the apparatus 100 for appraising an article of the present disclosure at step S102. As described above, information on the type and the model name of the article that is input by the customer and current location information of the customer may further included at step S102.

Next, the apparatus 100 for appraising an article analyzes the photographed image at step S103. As an example of an analysis method of the photographed image performed at step S103, a morphological analysis method, a geometrical analysis method, a statistical analysis method, a probabilistic analysis method, etc. may be applied.

Also, at step S103, the photographed image may be corrected to enhance appraisal accuracy through the photographed image. Also, at step S103, color information of the article may be extracted. Descriptions of image correction and color information extraction have been described above in detail, and thus additional descriptions thereof will be omitted.

Also, the apparatus 100 for appraising an article determines the type and the product model name of the article at step S104. Here, steps S103 and S104 may be performed in parallel rather than in series. That is, as described above, analysis of the photographed image performed at step S103 can be performed through various analysis methods. There may be the optimum analysis method according to the type and the product model name of the article. Therefore, the present disclosure may perform analysis by selecting at least one of the above-described analysis methods according to the result of the determining of the type and the product model name of the article. Accordingly, only a few particular analysis methods are performed rather than all various analysis methods, and thus the analysis can be effectively and precisely performed.

Next, the apparatus 100 for appraising an article extracts characteristic point information of the photographed image at step S105. Here, the characteristic point information may include characteristic point information on logo, the serial number, the flaw or contamination degree, the flaw or contamination position, etc. of the article.

Next, reference information is transmitted to the apparatus 100 for appraising an article from the storage unit 50 at step S106. Here, reference information is reference data used in determining authenticity of the article, may include image data or characteristic point data of original article, etc.

Next, based on the characteristic point information extracted at step S105 and the reference information received at step S106, authenticity of the article is determined at step S107. That is, at step S107, the characteristic point information may be compared with the reference information, authenticity may be determined based on the matching rate therebetween. Also, the apparatus 100 for appraising an article may determine an appearance grade of the article at step S108 based on the characteristic point information on the flaw or contamination degree, and the flaw or contamination position, etc., and on the color information of the article. Here, steps S107 and S108 are performed in series, but it is just an example, the steps may be performed in parallel or in reverse order.

Next, based on the product information received from the storage unit 50 at step S109, an evaluation amount of the article is calculated at step S110. The evaluation amount of the article is calculated at step S110 based on authenticity of the article determined at step S107 and the appearance grade of the article determined at step S108. Also, at step S110, as described above, the evaluation amount may be calculated by considering the color information of the article, the manufacturing year of the article extracted from the serial number of the article, detailed information, etc.

Next, the evaluation amount may be transmitted at step S111. Also, at step S111, when information on the photographed image transmitted from the customer is requested from the customer, product information of the article may be transmitted together.

Also, the present disclosure may provide store information and seller information that sell a product searched by the customer. Upon customer's request, information on a closest store to the current location of the customer may be provided based on the location information of the customer.

The method of appraising an article according to the present disclosure may be implemented in a form of program instructions, which are executable by various computer means, and stored in a computer-readable storage medium. The computer-readable storage medium may include stand-alone or a combination of program instructions, data files and data structures. The program instructions stored in the computer-readable storage medium may be specially designed and constructed for the present disclosure, or well-known to person of ordinary skilled in computer software technology field. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present disclosure.

Instructions of the principles of the present disclosure may be implemented as a combination of hardware and software. Also, the software may be implemented as an application program actually implemented in a program storage unit. Such an application program may be uploaded to a machine including any suitable architecture, and may be executed by the machine. Preferably, the machine may be implemented on a computer platform having hardware, such as one or more CPUs, a computer processor, RAM, and input/output (I/O) interfaces. Also, the computer platform may include operating systems and micro-instruction code. Various processes and functions described here may be part of micro-instruction code or part of an application program, or any combination thereof, and these may be executed by various processing devices including CPUs. Also, various peripheral devices, such as an additional data storage unit and a printer, may be connected to the computer platform.

Since part of the configuration systems, components and methods illustrated in the attached drawings are implemented using software, it should be additionally understood that actual connections between system components or process function blocks may be varied according to the scheme in which the principles of the present disclosure are programmed. When such instructions are given, those skilled in the art will be able to consider the principles of the present disclosure and similar embodiments or configurations.

The invention claimed is:

1. An apparatus for appraising an article, the apparatus comprising:
 a communication unit configured to receive a photographed image including a partial image or an entire image of the article; and
 a processing unit configured to:
  analyze the photographed image,
  extract characteristic point information from the photographed image via the analysis of the photographed image by the processing unit, compare the characteristic point information with reference information for the article and determine authenticity and an appearance grade of the article, and calculate an evaluation amount of the article based on the authenticity and the appearance grade of the article, wherein the processing unit is configured to distinguish a brand and a type of the article based on the photographed image.

2. The apparatus of claim 1, wherein the processing unit is configured to analyze the photographed image by selecting at least one of several image analysis methods based on the distinguished brand and the distinguished type of the article.

3. The apparatus of claim 1, wherein the processing unit is configured to extract color information of the article, and extract a tanned degree or a discolored degree of the article based on the color information.

4. The apparatus of claim 3, wherein the processing unit is configured to calculate the evaluation amount of the article based on the tanned degree or the discolored degree.

5. The apparatus of claim 1, wherein the characteristic point information includes characteristic point information on a serial number of the article, and the processing unit is configured to extract a manufacturing year of the article based on the serial number.

6. The apparatus of claim 1, wherein the processing unit is configured to extract a product model name of the article.

7. The apparatus of claim 6, wherein the processing unit is configured to calculate the evaluation amount of the article based on the product model name.

8. The apparatus of claim 6, wherein the processing unit is configured to search an external server or a storage unit for product information of the article based on the product model name, and the product information of the article includes at least one of an article amount including a factory price and a used price, a manufacturer, a seller, a store, a release year, a manufacturing year, a color, a trademark, a model, a grade, a weight, a material, a form, a maker, or inventory information for each store.

9. The apparatus of claim 8, wherein the processing unit is configured to calculate the evaluation amount of the article based on the product information of the article.

10. The apparatus of claim 8, wherein the communication unit is configured to receive information of a customer location, and the processing unit is configured to transmit information of a closest store to the customer location to a terminal of a customer and the inventory information for each store that are included in the product information.

11. The apparatus of claim 8, wherein the communication unit is configured to receive the photographed image for at least one of a bibliography, a warranty, a written appraisal, a guarantee card, or a warranty card of the article, and the processing unit is configured to extract the characteristic point information for at least one of a serial number, a reference number, a code number, a bar code, an image, a shape, or a letter included in the photographed image for at least one of the bibliography, the warranty, the written appraisal, the guarantee card, and the warranty card of the article.

12. An apparatus for appraising an article, the apparatus comprising:

a communication unit configured to receive a photographed image including a partial image or an entire image of the article; and a processing unit configured to:

analyze the photographed image, extract characteristic point information from the photographed image via the analysis of the photographed image by the processing unit, compare the characteristic point information with reference information for the article and determine authenticity and an appearance grade of the article, and calculate an evaluation amount of the article based on the authenticity and the appearance grade of the article, wherein the communication unit is configured to receive information of a type and a model name of the article that is input by a customer.

13. The apparatus of claim 12, wherein the processing unit is configured to distinguish a brand and the type of the article based on the information of the type and the model name of the article that is input by the customer.

14. An apparatus for appraising an article, the apparatus comprising:

a communication unit configured to receive a photographed image including a partial image or an entire image of the article;

a processing unit configured to:

analyze the photographed image, extract characteristic point information from the photographed image via the analysis of the photographed image by the processing unit, compare the characteristic point information with reference information for the article and determine authenticity and an appearance grade of the article, and calculate an evaluation amount of the article based on the authenticity and the appearance grade of the article; and, a terminal holding unit configured to hold a terminal having a camera photographing the article.

15. The apparatus of claim 14, wherein the terminal holding unit includes at least one supporting part, a mounting part for holding the terminal thereon, and a lens body mounted on the terminal.

16. The apparatus of claim 15, wherein the lens body includes at least one magnifying lens therein.

17. The apparatus of claim 16, wherein a side of the lens body is provided with a lamp unit, the lamp unit includes several UV (ultraviolet) lamps and several LED lamps, and the several UV lamps and the several LED lamps are provided in a shape surrounding the magnifying lens.

18. The apparatus of claim 17, wherein each of the several LED lamps is provided between two of the several UV lamps.

19. The apparatus of claim 16, wherein the lens body includes a rotary magnification adjusting housing configured to adjust a magnification of the at least one magnifying lens by being rotated.

* * * * *